United States Patent
Lim et al.

(10) Patent No.: US 9,780,920 B2
(45) Date of Patent: Oct. 3, 2017

(54) DISTRIBUTED TURBO ENCODER AND METHOD

(71) Applicants: Samsung Electronics Co., Ltd, Gyeonggi-do (KR); Korea Advanced Institute of Science and Technology, Daejeon (KR)

(72) Inventors: Sung Hoon Lim, Gyeonggi-do (KR); Won-Jong Noh, Seoul (KR); Jong-Bu Lim, Yongin-si (KR); Sang-Seok Yun, Daejeon (KR); Sung-Ho Chae, Gyeonggi-do (KR); Jeong-Seok Ha, Daejeon (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 147 days.

(21) Appl. No.: 14/707,336

(22) Filed: May 8, 2015

(65) Prior Publication Data
US 2015/0327274 A1    Nov. 12, 2015

(30) Foreign Application Priority Data

May 8, 2014    (KR) .................... 10-2014-0054851

(51) Int. Cl.
*H03M 13/00*    (2006.01)
*H04L 1/00*    (2006.01)
(Continued)

(52) U.S. Cl.
CPC ....... *H04L 1/0076* (2013.01); *H04B 7/15521* (2013.01); *H04J 13/0074* (2013.01);
(Continued)

(58) Field of Classification Search
CPC ............. H04W 72/0466; H04L 1/0078; H04J 13/0074

See application file for complete search history.

(56) References Cited

U.S. PATENT DOCUMENTS 7,912,147 B2 *    3/2011    Liu .................... H03M 7/30
                                                    375/295
7,975,199 B2 *    7/2011    Chindapol ........ H04B 7/15592
                                                    370/334

(Continued)

FOREIGN PATENT DOCUMENTS

CN    103986510 A    8/2014
JP    2014168229 A    9/2014

(Continued)

OTHER PUBLICATIONS

Garcia-Frias, J., et al.; "Compression of Correlated Binary Sources Using Turbo Codes"; IEEE Comm Ltrs; Oct. 2001; pp. 417-419.

(Continued)

*Primary Examiner* — Esaw Abraham (57) ABSTRACT

The present disclosure relates to an apparatus and method supportive of distributed turbo coding based on relay network utilizing a noisy network coding scheme. For this, included is a relay node operating as a component encoder to relay a signal from a source node to a next node in a distributed turbo coding scheme. The relay node quantizes the signal transmitted from the source node and then interleaves the quantized signal using a predetermined pattern to distinguish the signal transmitted from the source node from a signal to be output from an opposing node, so that the signal transmitted from the source node is relayed to the next node based on a noisy network coding scheme.

20 Claims, 7 Drawing Sheets (51) Int. Cl.
*H04W 72/04* (2009.01)
*H04J 13/00* (2011.01)
*H04B 7/155* (2006.01)
*H04W 84/04* (2009.01)

(52) U.S. Cl.
CPC .......... *H04L 1/0059* (2013.01); *H04L 1/0078* (2013.01); *H04W 72/0466* (2013.01); *H04L 2001/0097* (2013.01); *H04W 84/047* (2013.01)

(56) References Cited

U.S. PATENT DOCUMENTS

| | | | | |
|---|---|---|---|---|
| 8,358,679 B2* | 1/2013 | Zeitler | ................... | H04B 7/155 375/211 |
| 8,416,730 B2* | 4/2013 | Vucetic | ............. | H04B 7/15557 370/315 |
| 8,787,428 B2* | 7/2014 | Dai | ...................... | H04L 1/0077 370/315 |
| 8,819,529 B2* | 8/2014 | Tan | .................... | H04B 7/15592 714/786 |
| 8,902,737 B2* | 12/2014 | Ktenas | .................. | H04L 1/1825 370/225 |
| 8,948,232 B2* | 2/2015 | Hatefi | ..................... | H04L 1/004 375/211 |
| 9,490,940 B2* | 11/2016 | Lilleberg | ........... | H04B 7/15592 |
| 2009/0147841 A1* | 6/2009 | Chang | .................. | H04N 19/115 375/240.01 |
| 2014/0226699 A1 | 8/2014 | Kim et al. | | |

FOREIGN PATENT DOCUMENTS

| | | |
|---|---|---|
| KR | 20140101557 A | 8/2014 |
| WO | WO 2014/126333 A1 | 8/2014 |

OTHER PUBLICATIONS

Garcia-Frias, J., et al.; "Turbo-Like Codes for Transmission of Correlated Sources Over Noisy Channels"; IEEE Sig Proc Mag; Sep. 2007; pp. 58-66.

Nagpal, V., et al.; "Coding and System Design for Quantize-Map-and-Forward Relaying"; IEEE Journal on Selected Areas in Comm; Nov. 13, 2013: pp. 1423-1435.

Sengupta, A., et al.; "Graph-Based Codes for Quantize-Map-and-Forward Relaying"; IEEE Info Theory Workshop; Oct. 16, 2011; pp. 140-144.

* cited by examiner

DISTRIBUTED TURBO ENCODER AND METHOD

CROSS-REFERENCE TO RELATED APPLICATION AND CLAIM OF PRIORITY

The present application is related to and claims the benefit under 35 U.S.C. §119(a) of a Korean patent application filed in the Korean Intellectual Property Office on May 8, 2014 and assigned Serial No. 10-2014-0054851, the entire disclosure of which is incorporated herein by reference.

TECHNICAL HELD

The present disclosure relates to distributed turbo coding apparatuses and methods for multi-transmission in a mobile communication system.

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

in addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

in a typical wireless communication system, terminals positioned in areas with poor signal quality, such as cell boundaries or shadow areas, are difficult to serve with seamless communication services from base stations.

To address this issue, more attention is paid to relay networks that bring up with expanded service coverage and increased system capacity. A relay network means a network that expands service coverage with relay nodes. A relay node receives signals from a source node and transfers the received signals to other relay node or a destination node. The technique in which a relay node relays signals between a source node and other relay node or a destination node is denoted a "multi-hop transmission."

A representative relay network-related technique is IEEE 802.15.3-based wireless personal area network (WPAN).

Various schemes are being prepared to equip relay network with increased network capacity, reduced channel usage count along with steady communication performance.

Among such relay network-related schemes, noisy network coding has been proposed to obtain a communication performance that approaches the channel capacity. Noisy network coding is among the schemes for utilizing relay nodes in a relay network.

According to this scheme, a relay node in a relay network receives analog signals from a source node, quantizes the received analog signal, converts into digital signals, channel-codes, and transmits the resultant signals to a next node.

The noisy network coding scheme keeps the gap between a theoretical channel capacity achievable from a relay network and the upper-bound channel capacity at a predetermined value.

Upon adopting the noisy network coding scheme, the relay node conducts two stages of computation in order to transfer received signals to a next node. The first stage is to quantize the signals received from the source node, and the second is to map the quantized signals to particular symbols and transmit the mapped signals to the next node. For example, the next node is an other relay node or a destination node.

The relay node, upon the second stage of computation, conducts channel coding on the quantized signals. A low density generator matrix (LDGM) or LDPC code comes in use for the channel coding.

The following documents are related to the channel coding performed by the relay node.

[1] "Coding and System Design for Quantize-Map-and-Forward Relaying," IEEE Journal on Selected Areas in Communications, V. Nagpal, et al, 11, Nov. 2013, 1423-1435

[2] "Graph-based Codes for Quantize-Map-and-Forward Relaying," IEEE information Theory Workshop, A. Sengupta, et al, 16-20, Oct. 2011, 140-144

[3] "Turbo-Like Codes for Transmission of Correlated Sources over Noisy Channels," IEEE Signal Processing magazine, Garcia-Frias J., et al, September 2007, 58-66

[4] "Compression of Correlated Binary Sources Using Turbo Codes," IEEE Communications Letters, Garcia-Frias J., et al, October 2001, 417-419

Document [1] supra proposes the optimization of channel codes used in transmitting nodes and relay nodes. Pursuant to Document [1], there is a single relay node; the destination node uses multiple antennas; and the source node and relay node adopt the diagonal-bell laboratory layered space-time (D-BLAST) scheme for signal transmission. The optimization set forth in Document [1] applies to the receiving node independently observing signals respectively transmitted from the source node and the relay node. In other words, this scheme is difficult to apply to general relay networks.

Document [2] discloses selecting the best performing component code through repetitive simulations and allowing the relay node to use the same. Document [2], however, fails to suggest a generalized design to put the best performing component code to use.

Document [3] concerns use of LDGM codes to maintain the correlation between information items respectively observed by terminals, The technique set forth in Document [3] makes use of LDGM codes, in parallel or in a sequential and consecutive way, in order to address the high error floor issue that arises due to the low order of LDGM matrix.

Document [4] bears similar research results to those of Document [3]. Document [4] discloses using convolutional codes that are in parallel or sequentially consecutive with each other. Use of such distributed turbo codes (turbo-like codes) causes the joint decoding by the destination node to be too complicated, and in some cases, cannot guarantee the optimized relay network.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide the design architecture of a source, destination, and relay node with a performance approaching the optimal channel capacity in a relay node utilizing a noisy network coding scheme.

A proposed embodiment provides an apparatus and method supportive of distributed turbo coding based on relay network utilizing a noisy network coding scheme.

A proposed embodiment provides a channel coding and mapping apparatus and method that is performed by a relay node in a relay network utilizing a noisy network coding scheme.

A proposed embodiment suggests a mapping scheme by a relay node to allow a destination node to obtain a combining gain in a relay network utilizing a noisy network coding scheme.

A proposed embodiment provides a channel coding apparatus and method that is optimized while exhibiting a performance approaching the channel capacity without increasing complexity in a relay network utilizing a noisy network coding scheme.

A proposed embodiment provides an apparatus and method for allowing a relay node, constituting a relay network utilizing a noisy network coding scheme, to perform, as a component code encoder, distributed turbo coding on the relay network.

According to a proposed embodiment, a relay network comprises a relay node operating as a component encoder to relay a signal transmitted from a source node to a next node in a distributed turbo coding scheme. The relay node quantizes the signal transmitted from the source node and then interleaves the quantized signal using a predetermined pattern to distinguish the signal transmitted from the source node from a signal to be output from an opposing node, so that the signal transmitted from the source node is relayed to the next node based on a noisy network coding scheme.

According to a proposed embodiment, a method for relaying a signal in a relay network comprises, upon relaying a signal transmitted from a source node to a next node in a distributed turbo coding scheme, a relay node operating as a component encoder so that the signal transmitted from the source node is relayed to the next node based on a noisy network coding scheme.

Operating as the component encoder includes the relay node quantizing the signal transmitted from the source node and interleaving the quantized signal using a predetermined pattern to distinguish the signal transmitted from the source node from a signal to be output from an opposing node.

According to a proposed embodiment, the relay network utilizing the noisy network coding scheme secures an enhanced performance without sharp increases in complexity in the relay network while optimizing component codes using a well-known optimizing method such as extrinsic information transfer (EXIT) chart.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device.

According to various embodiments of the present disclosure, the destination node receives signals from a plurality of nodes and performs joint decoding on the received signals to thus restore desired signals. The plurality of nodes includes at least one relay node. For example, when one of two nodes is a relay node, the other can be a source node. The plurality of nodes can be all relay nodes.

As described above, at least two signals received by the destination node should be consistent with each other in the position of the systematic bits constituting the signals so that the destination node obtains a combining gain by the systematic bits respectively included in the two signals.

Proposed embodiments are now described in more detail with reference to the accompanying drawings.

Figure 1:
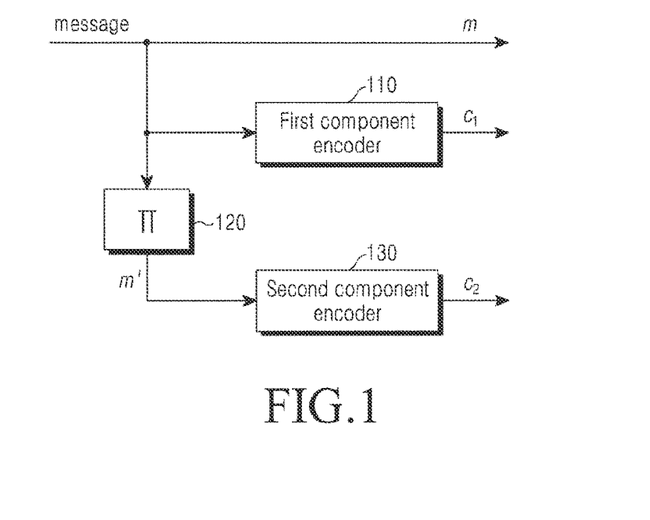
FIG. 1 illustrates the configuration of an exemplary relay network supportive of distributed turbo coding according to various embodiments of the present disclosure.

FIG. 1 illustrates an exemplary configuration of a relay network supportive of distributed turbo coding according to various embodiments of the present disclosure.

Referring to FIG. 1, first and second component encoders 110 and 130 respectively correspond to relay nodes. The relay node corresponding to the second component encoder 130 include an interleaver. A source node, instead of the relay node, plays a role as the first component encoder 110. In certain embodiments, the source node is able to quantize signals, encode and. symbol-map the quantized signals, and transmit the same. For ease of description, the first component encoder 110 is a relay node.

The source node and destination node constituting a relay network are not illustrated in FIG. 1. FIG. 1 merely illustrates a signal (message) transmitted from a source node to the first component encoder 110 and the interleaver 120. FIG. 1 illustrates an input signal (m), a signal ($c_1$) output from the first component encoder 110, and a signal ($c_2$) output from the second component encoder 130. Hereinafter, the signal input from the source node is denoted an "information signal," "information bit stream," or "information bits," and the signals output from the first component encoder 110 and the second component encoder 130 are collectively denoted an "extra signal," "extra bit stream," or "extra bits." In particular, the signal ($c_1$) output from the first component encoder 110 is denoted a "first extra signal," "first bit stream," or "first extra bits," and the signal ($c_2$) output from the second component encoder 130 is denoted a "second extra signal," "second extra bit stream," or "second extra bits." The area where information bits are positioned in a particular signal is denoted an "information part," and the area where extra bits are positioned in the signal is denoted an "extra part." In the same technical field, an information bit can be denoted a "systematic bit," and an extra bit can be denoted a "parity bit."

The first extra signal ($c_1$) is a signal generated by quantizing the information signal (m), encoding the quantized signal, and then symbol-mapping the encoded signal. The second extra signal ($C_2$) is a signal generated by quantizing an interleaved information signal (m'), encoding the quantized signal, and the symbol-mapping the encoded signal. The interleaved information signal (m') is a signal generated by the interleaver 120 interleaving the (m) with a predetermined pattern.

The information signal (m) is shown as if the information signal (m) is output separately from the first and second extra signals ($c_1$, $c_2$). In certain embodiments, however, the first component encoder 110 outputs a combined signal of information bits and first extra bits, and the second component encoder 130 outputs a combined signal of information bits and second extra bits.

The information bits in the signal output from the first component encoder 110 and the information bits in the signal output from the second component encoder 130 are ordered at the same positions. The extra bits in the signal output from the first component encoder 110 and the extra bits in the signal output from the second component encoder 130 are ordered at different positions.

As described above, the reason for positioning the information bits and extra bits in the signals output from the first and second component encoders 110 and 130 is to allow the destination node to obtain a combining gain. The specific operation of the first and second component encoders 110 and 130 generating extra signals to allow a combining gain to be obtained is described below. The specific configuration of extra signals generated by the first and second component encoders 110 and 130 is also described below.

Figure 2:
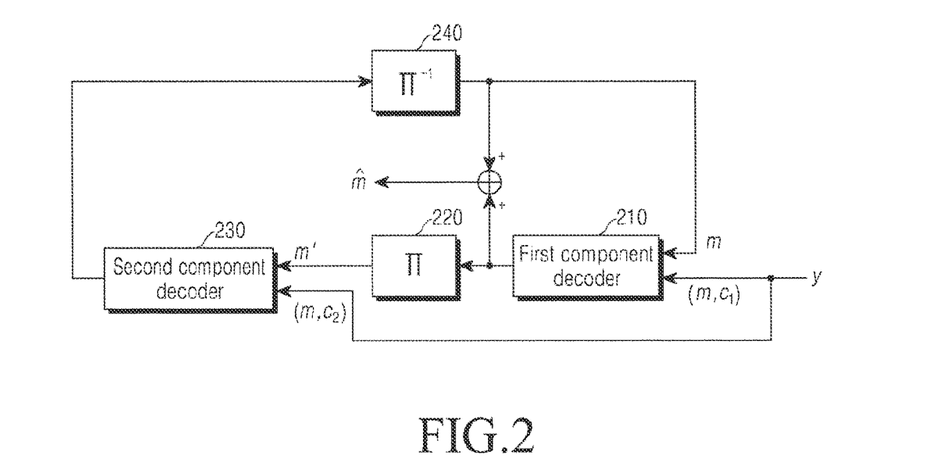
FIG. 2 illustrates the configuration of an exemplar conventional turbo decoder according to various embodiments of the present disclosure.

FIG. 2 illustrates the configuration of an exemplary conventional turbo decoder according to various embodiments of the present disclosure. The turbo decoder illustrated in FIG. 2 is an example of a parallel concatenated decoder.

Referring to FIG. 2, a signal (y) input to the turbo decoder includes an information part (m) where information bits are positioned and two extra parts ($c_1$, $c_2$) where extra bits are positioned. A first component decoder 210 decodes a prior information bit stream (m), the information part (m), and one extra part ($c_1$) to output a decoded information bit stream (m).

An interleaver 220 interleaves the information bit stream (m) output from the first component decoder 210 by using a predetermined pattern and outputs the interleaved information bit stream (m'). As an example, the interleaver 220 interleaves the information bit stream (m) to fit an index of a second component decoder 230.

The second component decoder 230 performs decoding based on an input signal including the interleaved information bit stream (m') corresponding to the prior information bit stream, the information part (m), and the other extra part ($c_2$) and outputs an information bit stream. as the result of the decoding. The information bit stream decoded by the second component decoder 230 is input to a deinterleaver 240.

The deinterleaver 240 deinterleaves the information bit stream input from the second component decoder 230 by using a predetermined pattern. As an example, the deinterleaver 240 interleaves the information bit stream (m) to fit an index of the first component decoder 210.

The information bit stream (m) deinterleaved by the deinterleaver 240 is input as a prior information bit stream of the first component decoder 210. The information bit stream (m) output from the deinterleaver 240 and the information bit stream (m) output from the first component decoder 210 are added by an adder in units of bits, outputting a prediction information bit stream ($\hat{m}$).

The above-described operation of the turbo decoder can be repeatedly performed in a predetermined number of times, and a final message be thereby estimated.

Figure 3:
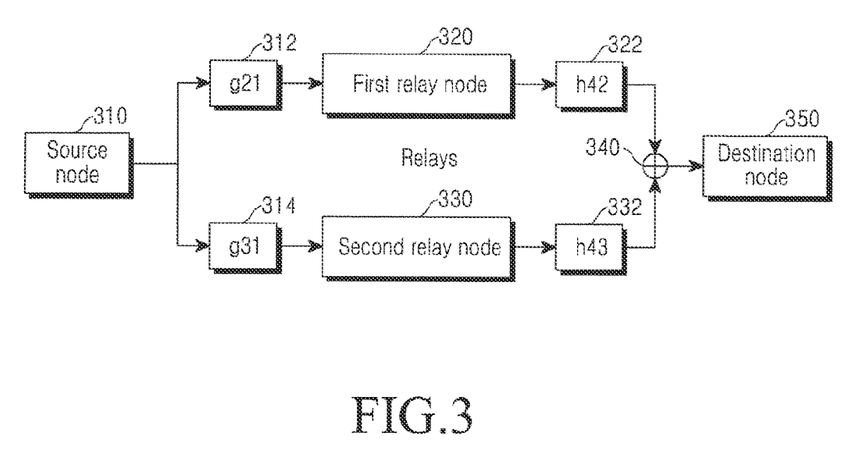
FIG. 3 illustrates an exemplary configuration supportive of distributed turbo coding in a relay network adopting a noisy coding scheme according to various embodiments of the present disclosure.

FIG. 3 illustrates an exemplary configuration supportive of distributed turbo coding in a relay network adopting a noisy coding scheme according to various embodiments of the present disclosure. Although FIG. 3 illustrates the configuration as implemented with two relay nodes, the configuration can be implemented with three or more relay nodes as well.

Referring to FIG. 3, a hop is present between a source node 310 and a destination node 350. In other words, only one relay network exists for each path connecting the source node 310 with the destination node 350. In certain embodiments, relay nodes corresponding to two or more hops are present on a path connecting the source node 310 with the destination node 350.

The source node 310 transmits analog signals. The signals transmitted from the source node 310 are received by the relay nodes 320 and 330, respectively. The signals respectively received by the relay nodes 320 and 330 include different channel features g21 (312) and g31 (314), respectively. For example, the signal received by the first relay node 320 is a signal including the signal transmitted from the source node 310 and the channel feature g21 (312), and the signal received by the second relay node 330 is a signal including the signal transmitted from the source node 310 and the channel feature g31 (314).

The first and second relay nodes 320 and 330 process the received signals considering noisy network coding and distributed turbo coding. By way of example, the first and second relay nodes 320 and 330 conduct quantization, encoding, and symbol-mapping on the received signals to support noisy network coding.

In order for the distributed turbo coding, the information bit stream input for encoding in the first relay node 320 differs in order from the information bit stream input fir encoding in the second relay node 330. The first relay node 320 performs encoding on a quantized bit stream while the second relay node 330 interleaves a quantized bit stream and then encodes the interleaved bit stream.

As a result of the encoding, a first output signal output from the first relay node 320 can be different in bit order from a second output signal output from the second relay node 330. Preferably, the information bits in the first output signal should be the same in order as the information bits in the second output signal. Putting the first output signal and the second output signal in the same order of information bits is for allowing the destination node 350 to have a combining gain.

Nevertheless, it is not that the extra bits in the first output signal and the second output signal should be placed in different orders. This is why the bits input for encoding in the first relay node 320 differ in order from the bits input for encoding in the second relay node 330.

The signals generated by the first and second relay nodes 320 and 330 are transmitted to the destination node 350. The signals transmitted by the first and second relay nodes 320 and 330 are mixed (340) on a radio channel and are received by the destination node 350. The signals that are transmitted from the first and second relay nodes 320 and 330, respectively, and received by the destination node 350 have different channel features h42 (322) and h43 (332), respectively.

The destination node 350 performs joint decoding the signals received from the first and second relay nodes 320 and 330 through a multiple access channel (MAC). The destination node 350 obtains information, which the source node 310 intends to transfer, through the joint decoding.

Figure 4:
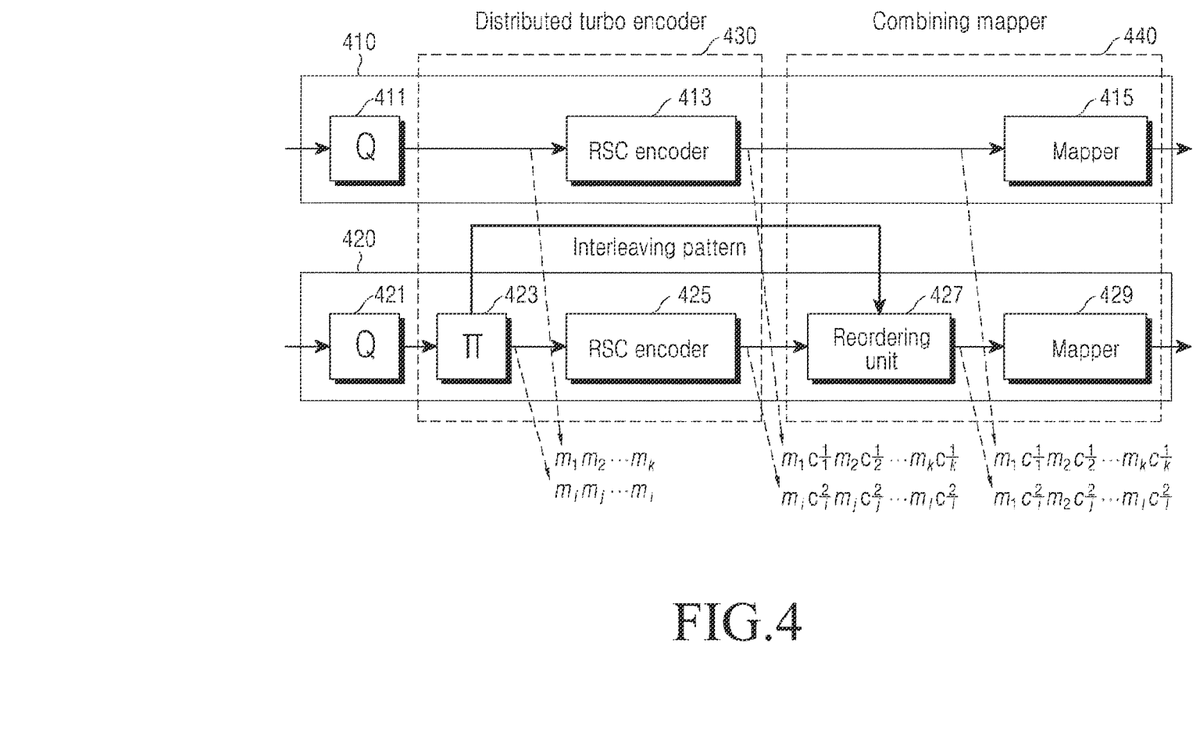
FIG. 4 illustrates a configuration for providing distributed turbo coding in a relay network according to various embodiments of the present disclosure.

FIG. 4 illustrates a configuration for providing distributed turbo coding in a relay network according to various embodiments of the present disclosure. Although assuming two relay nodes as shown in FIG. 4, the configuration comes up with one, two or more relay nodes.

Referring to FIG. 4, the configuration for offering distributed turbo coding includes a quantizing means, a distributed turbo encoder 430, and a combining mapper 440.

The quantizing means is configured with quantizers 411 and 421 respectively provided in the relay nodes 410 and 420. The quantizers 411 and 421 quantize analog input signals into digital signals.

The distributed turbo encoder 430 receives a plurality of quantized signals predicted to have the same bit order, adjusts the quantized signals to have different bit orders, and then encodes the resultant signals.

For example, the distributed turbo encoder 430 interleaves a quantized signal from one of the two relay nodes 410 and 420 in order to allow quantized signals, which are subject to encoding for the relay nodes, respectively, to have different bit orders. That is, the signal $(m_1 m_2 \ldots m_k)$ quantized by the first quantizer 411 is encoded by an RSC encoder 413. However, the signal $(m_1 m_2 \ldots m_k)$ quantized by the second quantizer 421 is interleaved by an interleaver 423 using a predetermined pattern (interleaving pattern) before encoded by an RSC encoder 425. As described supra, it can be verified that the signal $(m_1 m_2 \ldots m_k)$, quantized by the first quantizer 411, and the signal $(m_i m_j \ldots m_l)$, quantized by the second quantizer 421 and then interleaved, have different orders of information bits.

Accordingly, the encoded bit stream output from the RSC encoder 413 of the first relay node 410 and the encoded bit stream output from the RSC encoder 425 can have different bit orders as well. In certain embodiments, the encoded bit stream output from the first RSC encoder 413 is $m_1 c_1^1 m_2 c_2^1 \ldots m_k c_k^1$, and the encoded bit stream output from the second RSC encoder 425 is $m_1 c_1^2 m_j c_j^2 \ldots m_l c_l^2$. As such, the two encoded bit streams are identified to have different bit orders. It can be particularly verified that the information bits constituting the encoded bit streams have different positions.

The first and second RSC encoders 413 and 425 are presumed to use recursive systematic convolutional (RSC) codes.

The combining mapper 440, which includes mapper 440, mapper 429, and reordering unit 427, operates as a symbol mapper to allow a signal, supposed to be received by the destination node, to obtain a combining gain. The combining gain should be obtained targeting information bits. The information bits constituting the encoded bit stream of the first RSC encoder 413 are thus required to be consistent in position with the information bits constituting the encoded bit stream of the second RSC encoder 425 before symbol mapping in each relay node 410 and 420 in order to allow the combining gain to be obtained.

Bit reordering is carried out to allow the order $(m_1 m_2 \ldots m_k)$ of information bits in the encoded bit stream $m_1 c_1^1 m_2 c_2^1 \ldots m_k c_k^1$ output from the first RSC encoder 413 to be consistent with the order $(m_i m_j \ldots m_l)$ of information bits in the encoded bit stream $m_1 c_1^2 m_1 c_1^2 \ldots m_l c_l^2$ output from the second RSC encoder 425.

As an example, the second relay node 420 has a rearranging unit 427 to reorder the position of the encoded bits. The rearranging unit 427 is provided with a predetermined pattern (interleaving pattern) as used in the interleaver 423 in order to reorder the encoded bits. The rearranging unit 427 reorders the order $(m_i m_j \ldots m_l)$ of information bits in the encoded bit stream $m_1 c_1^2 m_2 c_1^2 \ldots m_1 c_1^2$ output from the second RSC encoder 425 to be consistent with the order $(m_1 m_2 \ldots m_k)$ of information bits in the encoded bit stream $m_1 c_1^1 m_2 c_2^1 \ldots m_k c_k^1$ output from the first RSC encoder 413. Hence, the encoded bit stream $m_1 c_i^2 m_2 c_j^2 \ldots m_k c_l^2$ output from the rearranging unit 427 is the same in order of information bits as the encoded bit stream $m_1 c_1^1 m_2 c_2^1 \ldots m_k c_k^1$ output from the first RSC encoder 413. In certain embodiments, the extra bits in the encoded bit stream $m_1 c_i^2 m_2 c_j^2 \ldots m_k c_l^2$ output from the rearranging unit 427 have different values than those of the extra bits in the encoded bit stream $m_1 c_1^1 m_2 c_2^1 \ldots m_k c_k^1$ output from the first RSC encoder 413.

Figure 6:
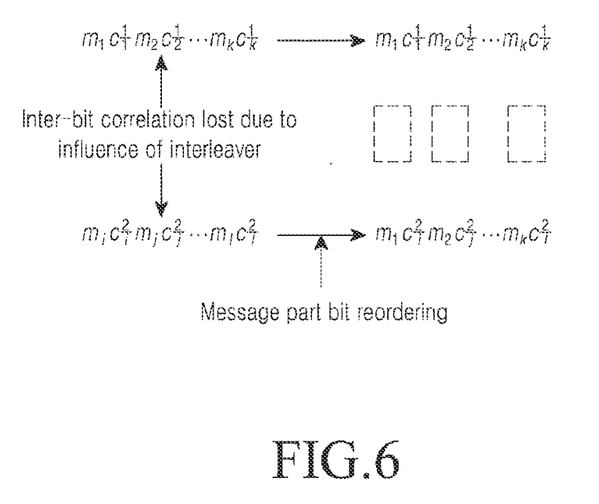
FIG. 6 illustrates bit reordering according to various embodiments of the present disclosure.

FIG. 6 illustrates bit reordering according to various embodiments of the present disclosure.

Referring to Fig. 6, it be identified that an encoded bit stream $m_1 c_1^1 m_2 c_2^1 \ldots m_k c_k^1$ output from an RSC encoder 413 provided in a first relay node 410 has no correlation with an encoded bit stream $m_x c_i^2 m_y c_j^2 \ldots m_z c_l^2$ output from an RSC encoder 425 provided in a second relay node 420 due to an influence by an interleaver. In order to recover the inter-bit correlation, the encoded bit stream $m_x c_i^2 m_y c_j^2 \ldots m_z c_l^2$ output from the RSC encoder 425 provided in the second relay node 420 is reordered for the position of information bits, outputting an encoded bit stream $m_1 c_i^2 m_2 c_j^2 \ldots m_k c_l^2$.

Accordingly, it is verified that the encoded bit stream $m_1 c_1^1 m_2 c_2^1 \ldots m_k c_k^1$ in the first relay node 410 is the same as the encoded bit stream $m_1 c_i^2 m_2 c_j^2 \ldots m_k c_l^2$ in the second relay node 420 for odd-numbered bits (information bits).

The encoded bit stream $m_1 c_1^1 m_2 c_2^1 \ldots m_k c_k^1$ output from the RSC encoder 413 provided in the first relay node 410 and the encoded bit stream $m_1 c_i^2 m_2 c_j^2 \ldots m_k c_l^2$, output from the RSC encoder 425 provided in the second relay node 420 and bit-reordered, are subjected to gray mapping. The gray mapping is conducted by mapping the encoded bit streams to gray codes. The signals transmitted from the relay nodes are rendered to have the same information part.

Figure 7A:
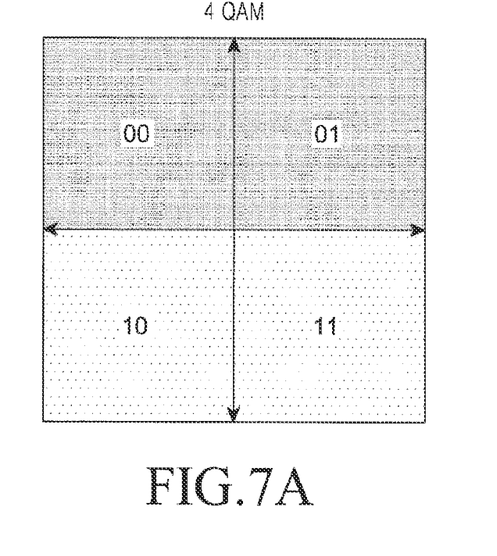
FIGS. 7A and 7B illustrate an exemplary operation of a combining mapper according to various embodiments of the present disclosure.
Figure 7B:
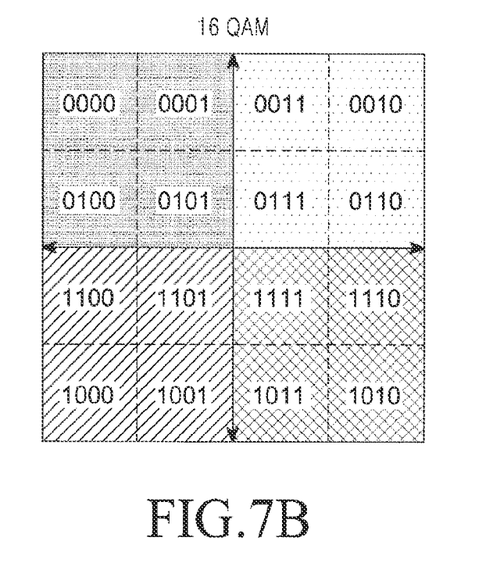

FIGS. 7A and 7B illustrate an exemplary operation of a combining mapper according to various embodiments of the present disclosure.

FIG. 7A illustrates an example in which an encoded bit stream is mapped to one symbol in each unit of two bits and is output, and FIG. 7B illustrates an example in which an encoded bit stream is mapped to one symbol in each unit of four bits and is output.

As set forth above, applying gray mapping to encoded bits increases the similarity between symbols respectively transmitted from the relay nodes, allowing the destination node a combining gain.

Unless a combining buffer 440 is used as the symbol mapper, the messages respectively transmitted from the relay nodes 410 and 420 are interleaved by a random interleaver, turning into independent signals from each other. This also cause the extra parts, which have passed through the RSC encoders, to be not correlated with each other, resultantly preventing the destination node from being allowed a combining gain.

Figure 5:
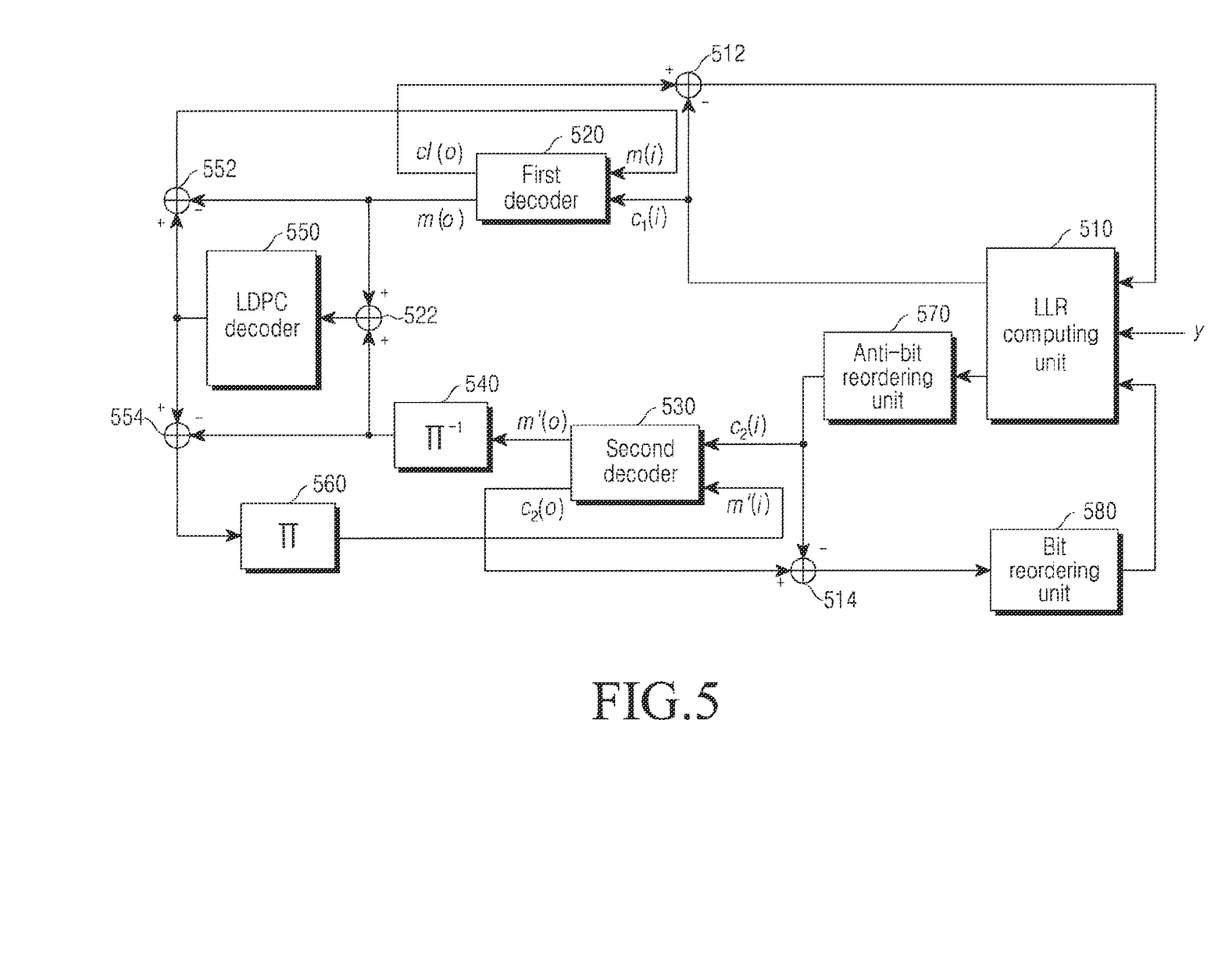
FIG. 5 illustrates the configuration of an exemplary destination node in a relay network according to various embodiments of the present disclosure.

FIG. 5 illustrates the configuration of an exemplary destination node in a relay network according to various embodiments of the present disclosure. In particular, FIG. 5 illustrates the configuration of a distributed turbo decoder decoding encoded signals transmitted for supporting a distributed turbo coding scheme.

The distributed turbo decoder illustrated in FIG. 5 operates similar to general-type turbo decoders. However, the proposed distributed turbo decoder is differentiated from the general-type turbo decoders by exchanging extrinsic information between component decoders through a decoder corresponding to a channel coder in a transmitting node.

Referring to FIG. 5, a log-likelihood radio (LLR) computing unit 510 computes LLRs for each relay node using a signal (y) received through an MAC. The LLR computing unit 510 is additionally input with change values of consecutive encoded bits per relay node in order to compute LLRs for each relay node. For example, the change values of the encoded bits from a first relay node are output values from a subtractor 512, and the change values of the encoded bits from a second relay node are output values that are output from the subtractor 514 and that are bit-reordered by a bit rearranging unit 580. The change values of the consecutive encoded bits per relay node are real numbers, rather than binary codes. For example, the change values of the consecutive encoded bits per relay node are defined as real numbers between 0 and 1.

Values $c_1(i)$, $c_2(i)$ respectively computed for the relay nodes by the LLR computing unit 510 are provided to their respective corresponding decoders 520 and 530 for decoding. The values $c_1(i)$, $c_2(i)$ respectively computed for the relay nodes correspond to encoded bit streams.

For example, the LLR computing unit 510 provides the LLR value $c_1(i)$ computed corresponding to the first relay node to the first decoder 520 and the LLR value $c_2(i)$ computed corresponding to the second relay node to the second decoder 530. The LLR value $c_2(i)$ computed corresponding to the second relay node is anti-bit reordered by an anti-bit reordering unit 570 and is then provided to the second decoder 530. The anti-bit reordering 570 is carried out to eliminate the influence of the combining mapper.

The first and second decoders 520 and 530 are BCJR decoders using convolutional codes.

In addition to $c_1(i)$ provided from the LLR computing unit 510, the prior-restored information bit m(i) is input to the first decoder 520. In addition to $c_2(i)$ provided from the LLR computing unit 510, the prior-restored and interleaved information bit m'(i) is input to the second decoder 530.

The first decoder 520 performs decoding using the LLR value $c_1(i)$ computed. corresponding to the first relay node and the prior-restored information bit m(i) and outputs an information bit m(0) and an encoded bit $c_1(0)$ by the decoding.

The second decoder 530 performs decoding using the LLR value $c_2(i)$ computed corresponding to the second relay node and the prior-restored and interleaved information bit m'(i) and outputs an information bit m'(0) and an encoded bit $c_2(0)$ by the decoding.

The subtractor 512 subtracts the LLR value $c_1(i)$ computed by the LLR computing unit 510 from the encoded bit $c_1(0)$ output from the first decoder 520. Variations among consecutive encoded bits computed by the subtractor 512 are provided to the LLR computing unit 510.

The subtractor 514 subtracts the LLR value $c_2(i)$ computed by the LLR computing unit 510 from the encoded bit $c_2(0)$ output from the second decoder 530. Variations among consecutive encoded bits computed by the subtractor 514 are provided to the LLR computing unit 510.

The variations among the consecutive encoded bits computed by the subtractor 514 are bit-reordered by a bit reordering unit 580 and are then provided to the LLR computing unit 510.

The encoded bits $c_1(0)$ and $c_2(0)$ obtained through the first and second decoders 520 and 530 are extrinsic information of the whole sequence. The extrinsic information is utilized as prior information upon estimating the LLR values for the respective transmitting signals of the relay nodes in subsequent repetitions.

The information bits (m(0), m'(0)) acquired through the first and second decoders 520 and 530 are used to decode channel codes in the relay nodes or source code. By way of example, assume that the LDPC decoder 550 is a channel decoder corresponding to a relay node or source code. Accordingly, the extrinsic information obtained through the channel decoder is utilized as prior information in next repetitions by each component decoder.

Specifically, the information bit m(0) obtained by the first decoder 520 and the information bit m(0) obtained by deinterleaving the information bit m'(0) obtained by the second decoder 530 are added together by the adder 522 and input to the LDPC decoder 550. The LDPC decoder 550 restores the information bits using the input information bits.

A subtraction is performed by the subtractor 552 between the information bit m(0) obtained by the first decoder 520 and the information bit restored by the LDPC decoder 550. The subtractor 552 subtracts the information bit m(0) obtained by the first decoder 520 from the information bit restored by the LDPC decoder 550 and outputs the result. The resultant information bit output from the subtractor 552 is input to the first decoder 520 as a prior information bit.

A subtraction is performed by the subtractor 554 between the information bit restored by the LDPC decoder 550 and the information bit that is obtained by the second decoder 530 and that is then deinterleaved by the deinterleaver 540. The subtractor 554 subtracts the information bit, which is obtained by the second decoder 530 and then deinterleaved by the deinterleaver 540, from the information bit restored by the LDPC decoder 550. The resultant information bit output from the subtractor 554 is interleaved by the interleaver 560 and then input to the second decoder 530 as a prior information bit.

The above-described operation is repeatedly a predetermined number of times, and the transmitted message is estimated by the final values output from the channel decoder.

Figure 8:
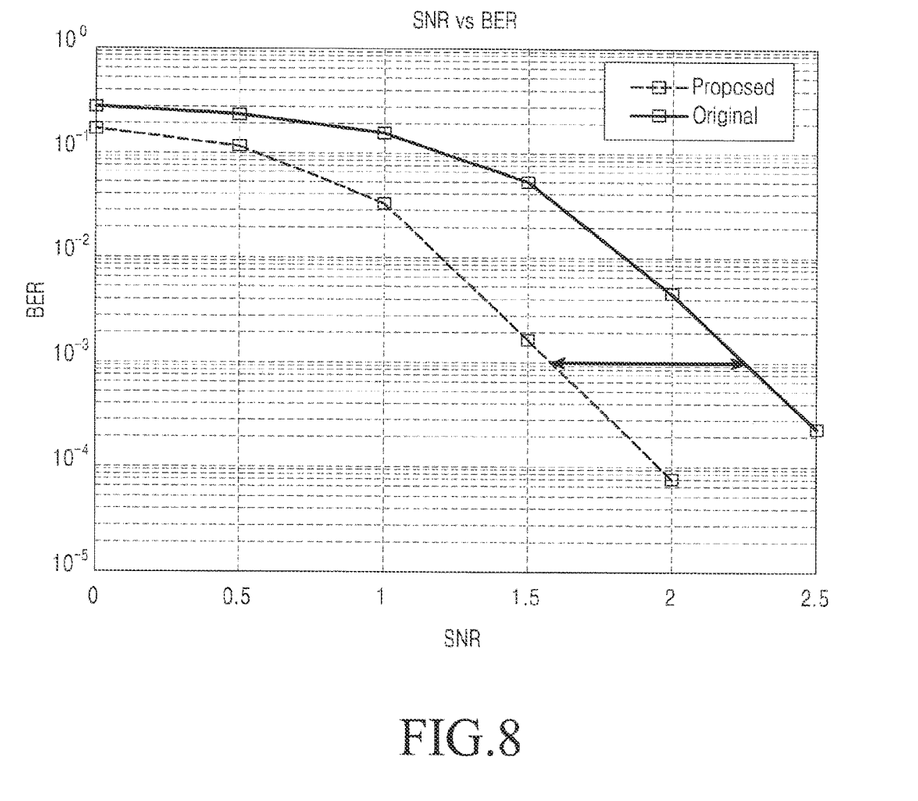
FIG. 8 illustrates experimental data obtained by analyzing an existing system and a system according to various embodiments of the present disclosure.

FIG. 8 illustrates experimental data obtained by analyzing an existing system and a system according to various embodiments of the present disclosure. It may be evident from FIG. 8 that the gain obtained by the system according to the embodiment is increased by about 0.7 dB as compared with the gain obtained by the conventional system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A relay network, comprising a relay node operating as a component encoder to relay a signal transmitted from a source node to a next node in a distributed turbo coding scheme, wherein the relay node is configured to:
   quantize the signal transmitted from the source node; and
   interleave the quantized signal using a predetermined pattern to distinguish the signal transmitted from the source node from a signal to be output from an opposing node in a manner that the signal transmitted from the source node is relayed to the next node based on a noisy network coding scheme.

2. The relay network of claim 1, wherein the relay node is further configured to:
   perform an encoding process on the interleaved signal; and
   perform combining mapping on a signal obtained by the encoding process to obtain a combining gain with the signal to be output from the opposing node.

3. The relay network of claim 2, wherein the relay node is further configured to perform the combining mapping by performing bit reordering on information bits constituting the signal obtained by the encoding process to turn the information bits back to an order prior to interleaving and applying gray mapping to the reordered information bits.

4. The relay network of claim 3, wherein the relay node is further configured to perform the encoding process on the interleaved signal using a recursive systematic convolutional (RSC) code.

5. The relay network of claim 3, wherein the relay node is further configured to perform the bit reordering based on the predetermined pattern.

6. The relay network of claim 1, further comprising a destination node configured to:
   receive signals from a plurality of nodes by the distributed turbo coding scheme; and
   independently apply convolutional code-based decoding to each of the signals received from the plurality of nodes to thereby restore the signals.

7. The relay network of claim 6, wherein the destination node is further configured to apply joint decoding to restore the signals received from the plurality of nodes.

8. The relay network of claim 1, wherein the opposing node is one of the source node and at least one other relay node.

9. The relay network of claim 8, wherein when the opposing node is the at least one other relay node, the opposing node is configured to:
   quantize the signal transmitted from the source node;
   perform an encoding process on the quantized signal; and
   perform combining mapping on a resultant signal.

10. The relay network of claim 1, wherein a signal output from the relay node and a signal output from the opposing node are in a same position of information bits as each other.

11. A method for relaying a signal in a relay network, the method comprising,
    upon relaying a signal transmitted from a source node to a next node in a distributed turbo coding scheme, operating a relay node as a component encoder in a manner that the signal transmitted from the source node be relayed to the next node based on a noisy network coding scheme,
    wherein operating the relay node as the component encoder comprises:
    quantizing, by the relay node, the signal transmitted from the source node; and
    interleaving, by the relay node, the quantized signal using a predetermined pattern to distinguish the signal transmitted from the source node from a signal to be output from an opposing node.

12. The method of claim 11, wherein operating a relay node as the component encoder further comprises:
    performing an encoding process on the interleaved signal; and
    performing combining mapping on a signal obtained by the encoding process to obtain a combining gain with the signal to be output from the opposing node.

13. The method of claim 12, wherein performing the combining mapping comprises:
    performing the combining mapping by performing bit reordering on information bits constituting the signal obtained by the encoding process to turn the information bits back to an order prior to interleaving; and
    applying gray mapping to the reordered information bits.

14. The method of claim 13, wherein performing the encoding process comprising performing the encoding process on the interleaved signal using a recursive systematic convolutional (RCA) code.

15. The method of claim 13, wherein the bit reordering is performed based on the predetermined pattern.

16. The method of claim 11, further comprising restoring, by a destination node, a signal by receiving signals from a plurality of nodes by the distributed turbo coding scheme and independently applying convolutional code-based decoding to each of the signals received from the plurality of nodes.

17. The method of claim 16, further comprising applying, by the destination node, joint decoding to restore the signals received from the plurality of nodes.

18. The method of claim 11, wherein the opposing node is one of the source node and at least one other relay node.

19. The method of claim 18, further comprising:
   in a case where the opposing node is the at least one other relay node, quantizing, by the opposing node, the signal transmitted from the source node,
   performing an encoding process on the quantized signal, and
   performing combining mapping on a resultant signal.

20. The method of claim 11, wherein a signal output from the relay node and a signal output from the opposing node are in a same position of information bits as each other.

* * * * *